United States Patent [19]

Peters

[11] 4,313,577
[45] Feb. 2, 1982

[54] ROTARY SUPPORT FOR ROLLS OF CONVOLUTED WEBS AND MEANS FOR DAMPING ITS NATURAL FREQUENCY OSCILLATIONS

[75] Inventor: Hartmut Peters, Hamburg, Fed. Rep. of Germany

[73] Assignee: Hauni-Werke Körber & Co. KG, Hamburg, Fed. Rep. of Germany

[21] Appl. No.: 152,183

[22] Filed: May 22, 1980

[30] Foreign Application Priority Data

Mar. 25, 1980 [DE] Fed. Rep. of Germany ....... 3011385

[51] Int. Cl.$^3$ ...................... B65H 17/08; F16F 15/10
[52] U.S. Cl. ........................................ 242/66; 242/55; 74/574
[58] Field of Search ....................... 242/65, 66, 55, 54; 73/526, 458, 468; 74/574; 226/60, 61; 64/21, 27 R, 27 NM

[56] References Cited

U.S. PATENT DOCUMENTS

| | | | |
|---|---|---|---|
| 2,198,403 | 4/1940 | Canady | 74/574 |
| 3,237,877 | 3/1966 | Printz et al. | 242/66 |
| 3,667,695 | 6/1972 | Brownscombe | 242/55 |
| 3,902,677 | 9/1975 | Wolf | 242/66 |

Primary Examiner—Leonard D. Christian
Attorney, Agent, or Firm—Peter K. Kontler

[57] ABSTRACT

A roll of convoluted paper web rests on two parallel supporting rollers having hollow housings for coaxial dynamic damping systems. The damping systems have cylindrical masses with trunnions which are surrounded by rubber rings fitting into sleeves which are snugly inserted into the hollow housings of the respective supporting rollers. The rings maintain the peripheral surfaces of the masses out of contact with the internal surfaces of the corresponding sleeves. The natural oscillation frequency of each dynamic damping system is or can be attuned to the natural oscillation frequency of the corresponding housing prior to assembly of the housings with the associated damping systems. The damping systems ensure that the peripheral surfaces of the housings remain in at least substantially uninterrupted contact with the outermost convolution of the roll of convoluted paper web. If the web is to be collected by a core within the roll, one of the housings is driven to move the web lengthwise from a source of supply toward the roll.

15 Claims, 2 Drawing Figures

U.S. Patent  Feb. 2, 1982  4,313,577
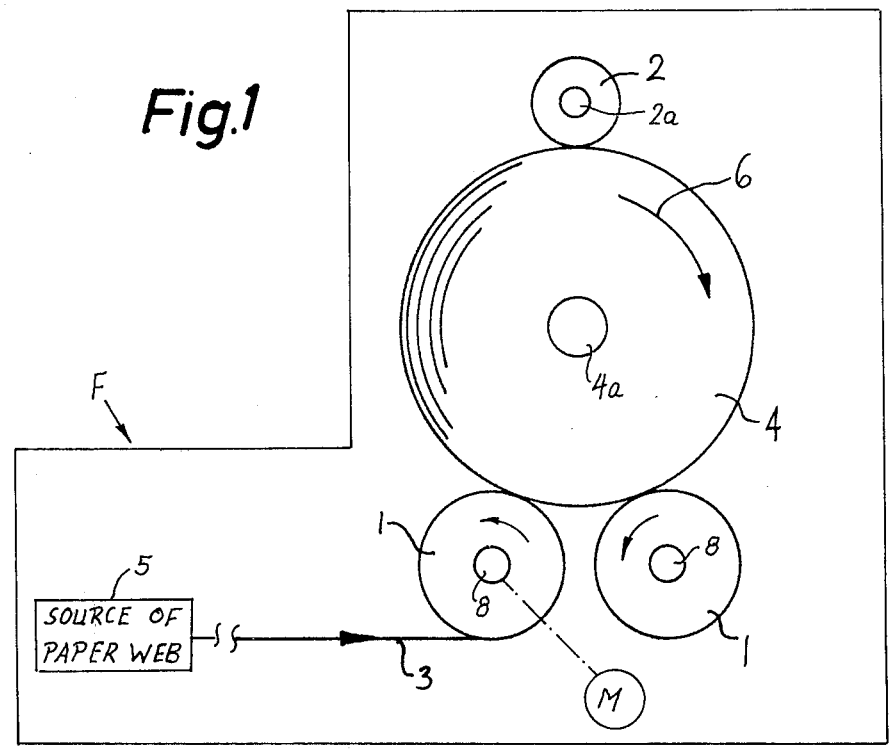
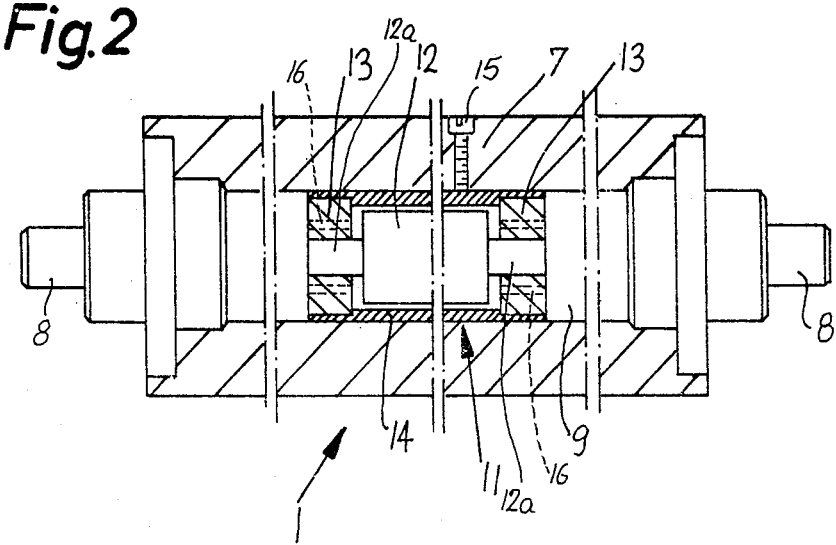

ROTARY SUPPORT FOR ROLLS OF CONVOLUTED WEBS AND MEANS FOR DAMPING ITS NATURAL FREQUENCY OSCILLATIONS

CROSS-REFERENCE TO RELATED APPLICATION

A rotary knife holder which embodies a dynamic damping system similar to the damping system of the present invention is described and claimed in the copending patent application Ser. No. 152,185 filed by Gerhard Hirsch on May 22, 1980 for "Rotary knife holder with means for damping its natural frequency oscillations".

BACKGROUND OF THE INVENTION

The present invention relates to rollers, drums and analogous rotary devices, and more particularly to improvements in rotary devices which exhibit the tendency to oscillate or vibrate during rotation, especially while supporting other rotary devices such as rolls or analogous supplies of convoluted paper webs or the like. Still more particularly, the invention relates to improvements in rollers which can be used in pairs or in groups of three or more to support and/or otherwise engage rotary parts, especially bobbins or reels of convoluted paper, synthetic plastic web stock or the like.

It is well known that a modern paper processing machine must turn out or otherwise process large quantities of paper web material or the like. This means that the parts which transport, convolute, unwind and/or otherwise treat webs or strips of paper, metallic foil, imitation cork, flexible cardboard, synthetic plastic material or the like must be driven at an ever increasing speed. Operation at elevated speeds invariably entails numerous problems including those which are attributable to vibrations of rotary parts, for example, vibrations or oscillations which are caused by improper balancing of rotary devices and are either negligible or acceptable at low speeds but cause serious problems (such as noise, pronounced wear and/or others) at elevated speeds. It will be readily appreciated that, as the stressing of rotary parts increases in response to increasing speed, the vibrations or oscillations of such parts become more pronounced and/or more frequent with the result that certain corrective measures must be undertaken in order to ensure satisfactory operation as soon as the RPM of such parts reaches a predetermined threshold value. Typical examples of apparatus or machines wherein oscillations of rotary parts are likely to create problems at relatively high speeds are those which serve for collection (rolling up) or unwinding of convoluted webs consisting of paper, synthetic plastic foil, metallic foil or the like. For the sake of simplicity and convenience, the invention and the problems which are solved by its advent will be described with reference to apparatus which serve to convolute webs of paper on cores or analogous holders to form reels, bobbins or similar supplies. However, it will be appreciated that the same problems arise and can be solved if the invention is embodied in apparatus for unwinding paper webs or like flexible strip materials from the cores of bobbins or reels.

In many presently known winding apparatus for paper webs, the outermost convolution of the supply of convoluted flexible strip material rests on two supporting rollers, at least one of which is driven by suitable motor means to rotate the core and the entire reel in a direction to collect the paper web. The reel is set into and maintained in rotary motion as a result of frictional contact between its outermost convolution and the external surface(s) of the driven supporting roller(s). If the supporting roller or rollers oscillate, the extent of frictional contact between their external surfaces and the outermost convolution of the reel which rests on the supporting rollers is merely reduced or can (at times) decrease to zero. It has been found that transverse oscillations of the supporting rollers are especially likely to affect the extent of frictional engagement between the peripheral surfaces of such rollers and the outermost convolution of the reel, irrespective of whether the reel is rotated in a direction to collect or to pay out the web. Transverse oscillations are undesirable because they temporarily reduce the magnitude of the force with which the outermost convolution of the reel bears against the peripheral surfaces of the supporting rollers. The result is that the torque which the supporting roller or rollers transmits or transmit to the reel fluctuates within a wide range. This, in turn, can influence the uniformity of the convolutions on the reel as well as the operation of the machine or machines which supply the web to and/or receive the web from the winding or unwinding apparatus. It was further determined that oscillations which are due to flexing of the supporting rollers (in contrast to oscillatory movements of the entire supporting rollers) are just as undesirable. In other words, the quality of a winding or unwinding operation can be affected by oscillations which involve movements of the entire supporting rollers with respect to their bearings as well as oscillations which involve recurrent movements of certain portions of peripheral surfaces of such rollers relative to the remaining portions of the peripheral surfaces. For example, a relatively long supporting roller is likely to flex in the middle, whereas the extent of flexure at the ends of such roller is negligible or nil.

It was already proposed to damp the vibratory or oscillatory movements of supporting rollers for reels of paper or the like by employing hollow rollers whose interior is filled, at least in part, with a flowable medium, e.g., water, particles of sand or the like. Such supporting rollers operate satisfactorily up to a certain speed. However, once the RPM of the supporting rollers which are filled, at least in part, with a flowable material reaches a given threshold value, their oscillations become even more pronounced than in the absence of flowable material because the confined material contributes to the unbalancing of the supporting rollers and causes even more pronounced vibratory movements.

OBJECTS AND SUMMARY OF THE INVENTION

An object of the invention is to provide a novel and improved apparatus which can be used for collection or paying out of webs of paper or the like and wherein the rotary supporting means for a supply of convoluted material is or are constructed and assembled with a view to reduce its or their oscillations to an acceptable value or to zero.

Another object of the invention is to provide novel and improved supporting rollers for use, in apparatus for winding or unwinding paper webs or the like, as repositories for bobbins or reels of convoluted paper webs or the like.

A further object of the invention is to provide supporting rollers whose oscillations are within acceptable limits at relatively low as well as at elevated or extremely high rotational speeds of such parts.

An additional object of the invention is to provide one or more rollers which serve to support a supply of convoluted paper or the like and can transmit torque to the supply at a uniform rate and within a desired range irrespective of the speed at which the flexible material is collected or paid out by the rotating supply.

A further object of the invention is to provide supporting rollers for bobbins or reels of convoluted paper or the like with novel and improved means for reducing the extent of oscillatory movements when the rollers are driven at an elevated speed.

Another object of the invention is to provide supporting rollers which are capable of driving a reel of convoluted paper or the like with a constant force within a range of speeds which is much wider than in heretofore known apparatus which are used for winding or unwinding of paper webs, e.g., in machines for the making and/or processing of smokers' products, in machines for the making and/or processing of paper webs, and/or under many other circumstances when a continuous web of paper, synthetic plastic material, metallic foil, imitation cork or the like is to be rapidly collected on or paid out by a rotary holder.

A further object of the invention is to provide a very simple, compact and inexpensive supporting roller for reels of convoluted paper webs or the like.

Another object of the invention is to provide a supporting roller or a set of supporting rollers which can be installed in many existing machines as superior substitutes for presently used rollers serving to support rotary supplies (such as bobbins or reels) of convoluted paper web stock or the like.

A further object of the invention is to provide novel and improved means for reducing or eliminating oscillations of driven rollers which support reels of convoluted paper or the like.

The invention is embodied in an apparatus for convoluting or paying out convoluted webs of paper or other flexible strip material. The apparatus comprises an elongated rotary core or another suitable holder for a supply (e.g., a roll) of convoluted flexible strip material, and supporting means including at least one supporting roller for the outermost convolution of the supply on the holder. The roller includes a hollow housing having a cylindrical peripheral surface which contacts the outermost convolution of the supply on the holder. The housing exhibits the tendency to oscillate at a given natural frequency, especially at elevated RPM of the supporting roller, and the latter further comprises means for damping the oscillations of the housing. Such damping means includes a dynamic damping system which is installed in the interior of the housing and has a natural oscillation frequency which is attuned to the given oscillation frequency of the housing.

The supporting means for the supply of convoluted flexible strip material can comprise and normally comprises a plurality of (e.g., two) supporting rollers which are rotatable about parallel axes and each of which has a hollow cylindrical housing as well as a dynamic damping system in the interior of the respective housing.

Each damping system preferably includes a substantially cylindrical mass and coupling means (preferably including one or more ring-shaped elastic elements) for maintaining the mass out of contact with the respective housing. The coupling means preferably further includes a sleeve which is coaxially inserted into the housing of the respective supporting roller and spacedly surrounds the respective mass.

The novel features which are considered as characteristic of the invention are set forth in particular in the appended claims. The improved supporting roller itself, however, both as to its construction and the mode of installing and using the same, together with additional features and advantages thereof, will be best understood upon perusal of the following detailed description of certain specific embodiments with reference to the accompanying drawing.

BRIEF DESCRIPTION OF THE DRAWING

FIG. 1 is a schematic fragmentary end elevational view of an apparatus with two supporting rollers which embody the present invention; and FIG. 2 is an enlarged fragmentary axial sectional view of one of the supporting rollers.

DESCRIPTION OF THE PREFERRED EMBODIMENTS

FIG. 1 shows an apparatus which serves to convolute a continuous paper web 3 onto the rotary holder or core 4a of a reel or bobbin to form a supply or roll 4 of convoluted flexible strip material. The outermost convolution of the supply or roll 4 rests on the peripheral surfaces of two supporting rollers 1, at least one of which is constructed, mounted and assembled in accordance with an embodiment of the present invention. The direction in which the driven left-hand supporting roller 1 advances the web 3, which is supplied by a suitable source 5, is indicated by arrows. The right-hand supporting roller 1 may but need not be driven to rotate at the exact speed of the left-hand supporting roller. It is equally possible to drive the right-hand supporting roller 1 (in a counterclockwise direction, as viewed in FIG. 1) and the left-hand supporting roller may constitute an idler roller which is rotated by the outermost convolution of the web 3 forming the roll 4.

The illustrated apparatus can be used with equal advantage for transport of a continuous web from the roll 4 to a consuming machine, e.g., to a machine which divides a relatively wide web into narrower webs serving as starting material for uniting bands, cigarette paper strips, portions or blanks of soft packs for plain or filter cigarettes, or the like. All that is necessary is to rotate the one and/or the other supporting roller 1 in a direction to drive the roll 4 counterclockwise, as viewed in FIG. 1, and to replace the source 5 with a machine or apparatus which consumes or processes paper webs or the like.

The holder or core 4a, together with the shafts 8 of the supporting rollers 1, is mounted in a frame F. The apparatus further comprises a third roller 2 which constitutes a tensioning means in that it rests on the uppermost portion of the outermost convolution of the roll 4 and urges the latter against the peripheral surfaces of the supporting rollers 1 so that the roll 4 cannot rise above and away from the peripheral surfaces of the rollers 1. The shaft 2a of the tensioning roller 2 is preferably movable up and down in a vertical slot (not shown) of the frame F. If desired, the roller 2 can be biased downwardly against the roll 4 so that the outermost convolution of the roll 4 bears against the supporting rollers 1 with a force exceeding the force of gravity acting upon the roll 4 and its core 4a. The arrow 6 denotes the direction of rotation of the core 4a in order to collect the web 3. The means for driving the left-hand supporting roller 1 comprises a motor M, e.g., a variable-speed electric motor.

In accordance with a feature of the invention, at least one of the supporting rollers 1 embodies a dynamic damping system 11, one form of which is illustrated in FIG. 2. The purpose of the damping system 11 is to eliminate or reduce the amplitude of undesirable natural frequency oscillations of the housing of the respective supporting roller 1.

The supporting roller 1 which is shown in FIG. 1 comprises a hollow cylindrical housing 7 which is mounted on two stub shafts 8 and has an axial passage or bore 9 for the dynamic damping system 11. The housing 7 is made of a metallic material and its axial length may be several times that shown in FIG. 2. The damping system 11 comprises a cylindrical mass 12 which is coaxial with the housing 7 and has end portions or trunnions 12a surrounded by elastic elements 13 in the form or rubber rings fitting snugly into the corresponding portions of a metallic sleeve 14 which, in turn, is snugly fitted into the passage 9 of the housing 7. The elastic elements 13 may be said to constitute two components of a means for releasably coupling the mass 12 to the housing 7; the remaining component of such coupling means is the sleeve 14. The outer diameters of the elastic elements 13 are selected in such a way that the peripheral surface of the mass 12 is spaced apart from the internal surface of the sleeve 14. These elastic elements 13 enable the mass 12 to oscillate relative to the housing 7 and/or vice versa. The means for releasably securing the sleeve 14 to the housing 7 includes one or more screws or bolts 15.

If desired, the illustrated elastic elements 13, which are made of rubber or a similar elastomeric material, can be replaced by other types of elastic elements, e.g., by cushions consisting of or including metallic filaments. Such cushions are inserted into the sleeve 14 to replace the elastic elements 13 and to maintain the mass 12 in a position of coaxiality with the housing 7. Cushions which consist exclusively of metallic filamentary material and can be used as substitutes for the elastic elements 13 of FIG. 2 are sold, for example, by the firm Stop-Choc of Magstadt, Federal Republic Germany.

The sleeve 14 is optional. Thus, the elastic elements 13 (or analogous elastic means, such as the aforediscussed cushions) may constitute the sole coupling means between the housing 7 and the mass 12 of the dynamic damping system 11. The utilization of a sleeve 14 is preferred at this time because the entire dynamic damping system 11 can be assembled outside of the passage 9 as a self-sustaining unit or module which is thereupon adjusted so that its natural oscillation frequency is attuned to that of the housing 7 of the supporting roller 1 before the latter is installed in the apparatus of FIG. 1. The screw or screws 15 allow for rapid attachment or removal of the module.

It has been found that the improved damping system 11 is capable of rapidly eliminating or effectively counteracting oscillations or vibrations of the supporting roller 1. Such oscillations are likely to develop or tend to develop as a result of slippage of the web 3 relative to the peripheral surfaces of the housings 7 of the supporting rollers 1 as well as a result of fluctuations of the magnitude of frictional forces between the peripheral surfaces of the rollers 1 on the one hand and the web 3 and the outermost convolution of the roll 4 on the other hand. Damping of the just discussed vibrations results in much quieter operation of the apparatus, i.e., stray movements of the rollers 1 are reduced to an acceptable value or to zero. All that is necessary is to properly attune the natural oscillation frequency of the damping system 11 to the natural oscillation frequency of the housing 7. Such tuning can be carried out in a number of ways. Thus, one mode of properly attuning the natural oscillation frequency of the damping system 11 to the natural oscillation frequency of the housing 7 is by proper dimensioning of the mass 12. Another mode includes proper selection of the spring constant of the elastic elements 13. Moreover, oscillatory movements of the improved damping system 11 can be influenced by appropriate selection of the material of elastic elements 13 as well as by other measures, such as by drilling annuli of holes or bores 16 in each of the elements 13 so that each annulus surrounds the respective trunnion 12a. The axes of the bores 16 are parallel to the common axis of the housing 7 and mass 12.

The aforediscussed ability of the improved damping system 11 to reduce or eliminate vibratory or analogous stray movements of the rollers 1 is further attributable to the fact that each and every component of the system 11 consists of portions which, when taken together, are distributed mirror symmetrically with reference to the axis of the housing 7. This ensures that the damping system 11 does not tend to act as an unbalance which would impel the housing 7 to move relative to the frame F, either in its entirety or in part. Such mirror symmetrical distribution of portions of all component parts of the damping system 11 remains unchanged at elevated RPM of the supporting rollers 1, i.e., the damping system cannot act as an unbalancing means when the rotational speed of the respective supporting roller 1 reaches a relatively high threshold value at which a conventional supporting roller begins to oscillate at a frequency and/or amplitude which adversely affects the operation of the web collecting or dispensing apparatus. In fact, it has been found that the improved dynamic damping system 11 is especially effective at elevated rotational speeds of the respective supporting rollers.

Another important advantage of the dynamic damping system 11 is that it does not contribute excessively to the bulk of the respective supporting roller. The housing 7 is hollow, and its axial passage 9 can readily accommodate the entire damping system 11 so that the outer diameter of the housing 7 need not be increased owing to the presence of the improved damping system in its interior. The outer diameters of the supporting rollers 1 can be reduced below those of conventional supporting rollers, and the oscillations which invariably develop when using small-diameter supporting rollers of conventional design can be eliminated or their amplitude reduced to an insignificant value. The damping action is so rapid that eventual oscillations during the interval immediately following the start of rotation can be damped before they could adversely influence the winding of a paper web 3 or the like onto the core 4a.

The roll 4 of FIG. 1 can be supported by three or more rollers 1, each of which may include a housing 7 and a dynamic damping system 11 (or an analogous damping system) therein. The axes of all supporting rollers are parallel to each other and to the axis of the holder or core 4a. Satisfactory tuning of the natural oscillation frequency of the damping system 11 ensures that the peripheral surfaces of the rollers 1 are in continuous contact with the outermost convolution of the roll 4 or that the intervals of disengagement (if any) of such peripheral surfaces from the outermost convolution are too short to adversely influence the winding or dispensing operation. This, in turn, guarantees highly satisfactory (especially uniform) transmission of torque from the driven supporting roller 1 to the roll 4.

It goes without saying that the components of the damping system 11 need not be fully assembled outside of the passage 9, i.e., that such components can be assembled, one after the other, in the interior of the housing 7. The aforedescribed mode of assembling (namely, the forming of a self-sustaining module which is properly tuned and thereupon inserted into the passage 9) is preferred at this time because it saves time and renders it possible to resort to semiskilled or even unskilled labor. Moreover, the manipulation of self-sustaining modules is simpler and less expensive than the manipulation of discrete component parts of the damping system 11 at the locale where the system is built into the housing 7.

The damping system 11 is preferably installed in the region of maximal flexure-induced amplitude of vibrations of the housing 7. Thus, if the housing 7 is relatively long and tends to flex at a maximum rate midway between the stub shafts 8, the mass 12 is preferably installed centrally between the shafts 8 to oppose or eliminate such flexure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. In an apparatus of convoluting or paying out convoluted webs of paper or other flexible strip material, the combination of a holder for a supply of convoluted flexible strip material; and supporting means including at least one supporting roller for the outermost convolution of said supply, said roller including a hollow rotary housing having a cylindrical peripheral surface contacting the outermost convolution of the supply on said holder, said housing exhibiting the tendency to oscillate at a given natural frequency in response to rotation of said supporting roller, and means for damping the oscillations of said housing including a dynamic damping system disposed in the interior of said housing and having a natural oscillation frequency which is attuned to said given frequency.

2. The combination of claim 1, wherein said supporting means includes a plurality of supporting rollers having parallel axes, each of said rollers having a hollow housing and a dynamic damping system in the respective housing.

3. The combination of claim 1, wherein said damping system includes a mass and means for coupling said mass to said housing so that the mass can oscillate relative to said housing and vice versa.

4. The combination of claim 3, wherein said coupling means comprises at least one elastic element.

5. The combination of claim 4, wherein said mass is a cylinder having end portions and said coupling means includes discrete elastic elements surrounding said end portions of said cylinder.

6. The combination of claim 5, wherein said coupling means further comprises a sleeve coaxially installed in said housing and spacedly and coaxially surrounding said cylinder.

7. The combination of claim 6, further comprising means for fixedly securing said sleeve to said housing.

8. The combination of claim 4, wherein said elastic element is a ring.

9. The combination of claim 8, wherein said ring consists at least in part of elastomeric material.

10. The combination of claim 9, wherein said mass includes two coaxial trunnions and said coupling means comprises two elastomeric rings surrounding said trunnions and arranged to maintain said mass out of contact with said housing.

11. The combination of claim 1, wherein said housing is elongated and includes a hollow portion which is subject to maximal flexure-induced oscillations, said system being installed in said hollow portion.

12. The combination of claim 11, wherein said housing includes first and second end portions and said hollow portion thereof is disposed substantially midway between said end portions.

13. The combination of claim 1, wherein said holder is a rotary core.

14. The combination of claim 1, further comprising means for rotating said housing.

15. The combination of claim 1, wherein said flexible material is trained over said housing.

* * * * *